United States Patent [19]
Harben, Jr.

[11] 3,986,231
[45] Oct. 19, 1976

[54] POULTRY PROCESSING METHOD

[75] Inventor: Grover S. Harben, Jr., Gainesville, Ga.

[73] Assignee: Gainesville Machine Company, Inc., Gainesville, Ga.

[22] Filed: Jan. 21, 1974

[21] Appl. No.: 435,243

Related U.S. Application Data

[62] Division of Ser. No. 228,962, Feb. 24, 1972, Pat. No. 3,806,988.

[52] U.S. Cl. ................................................. 17/45
[51] Int. Cl.² ......................................... A22C 21/00
[58] Field of Search ............................. 17/11, 45

[56] References Cited
UNITED STATES PATENTS

| | | | |
|---|---|---|---|
| 2,855,624 | 10/1958 | Jerome et al. | 17/11 |
| 3,555,593 | 1/1971 | Scheier | 17/45 |
| 3,685,096 | 10/1972 | Harben, Jr. | 17/45 |
| 3,750,231 | 8/1973 | Schreuder | 17/11 |
| 3,802,028 | 4/1974 | Scheier et al. | 17/45 |

Primary Examiner—Russell R. Kinsey
Assistant Examiner—James D. Hamilton
Attorney, Agent, or Firm—Newton, Hopkins & Ormsby

[57] ABSTRACT

A method of processing poultry including conveying the poultry in a head lowermost position successively along a prescribed path, moving a processing tool synchronously with each of the birds, moving the tool through a series of predetermined positions with respect to the bird as it is moved synchronously therewith, and selectively holding and orienting each bird by its body as the tool is moved through the series of predetermined positions to orient the tool with respect to the bird during the processing operation.

6 Claims, 13 Drawing Figures

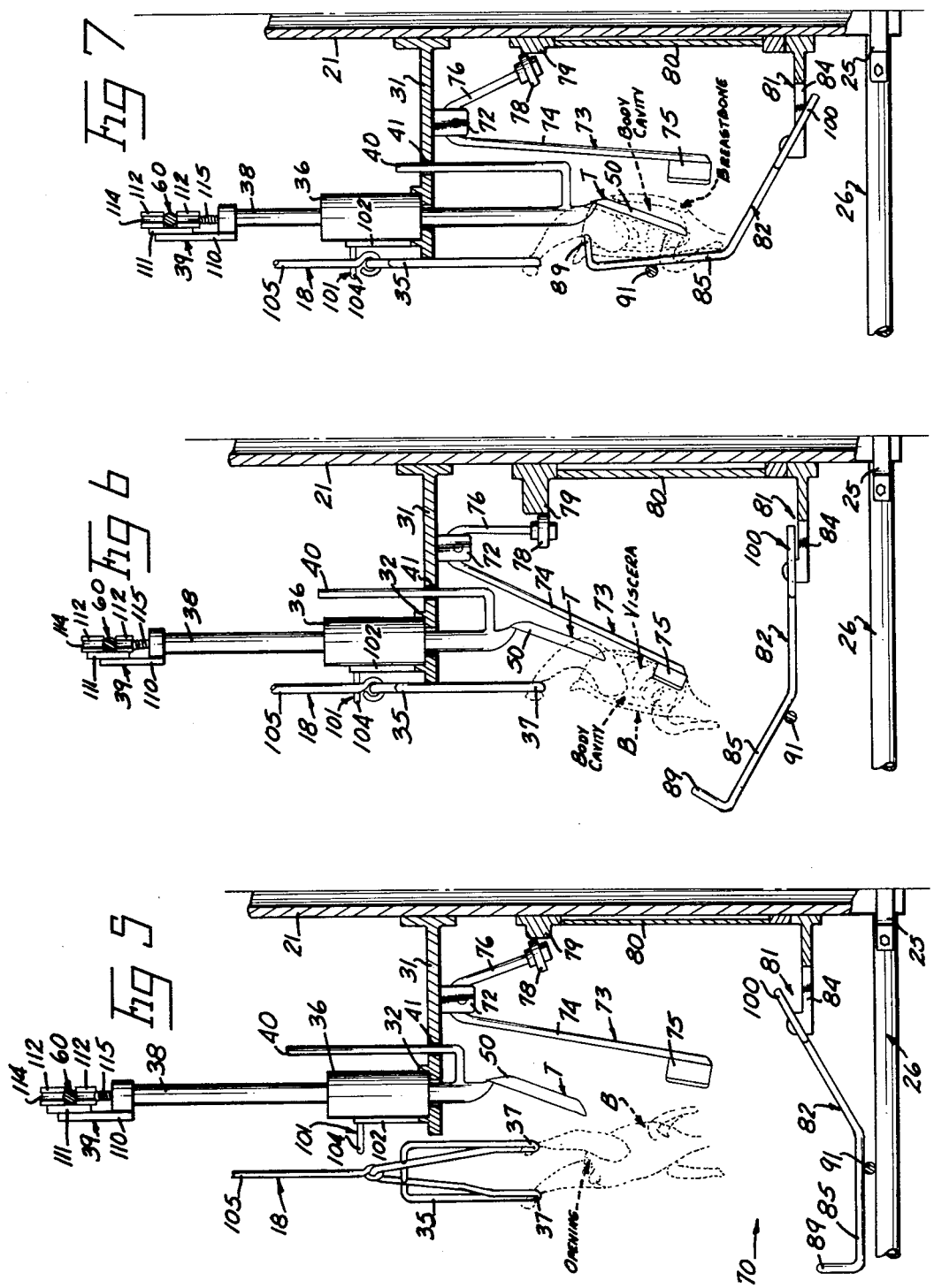

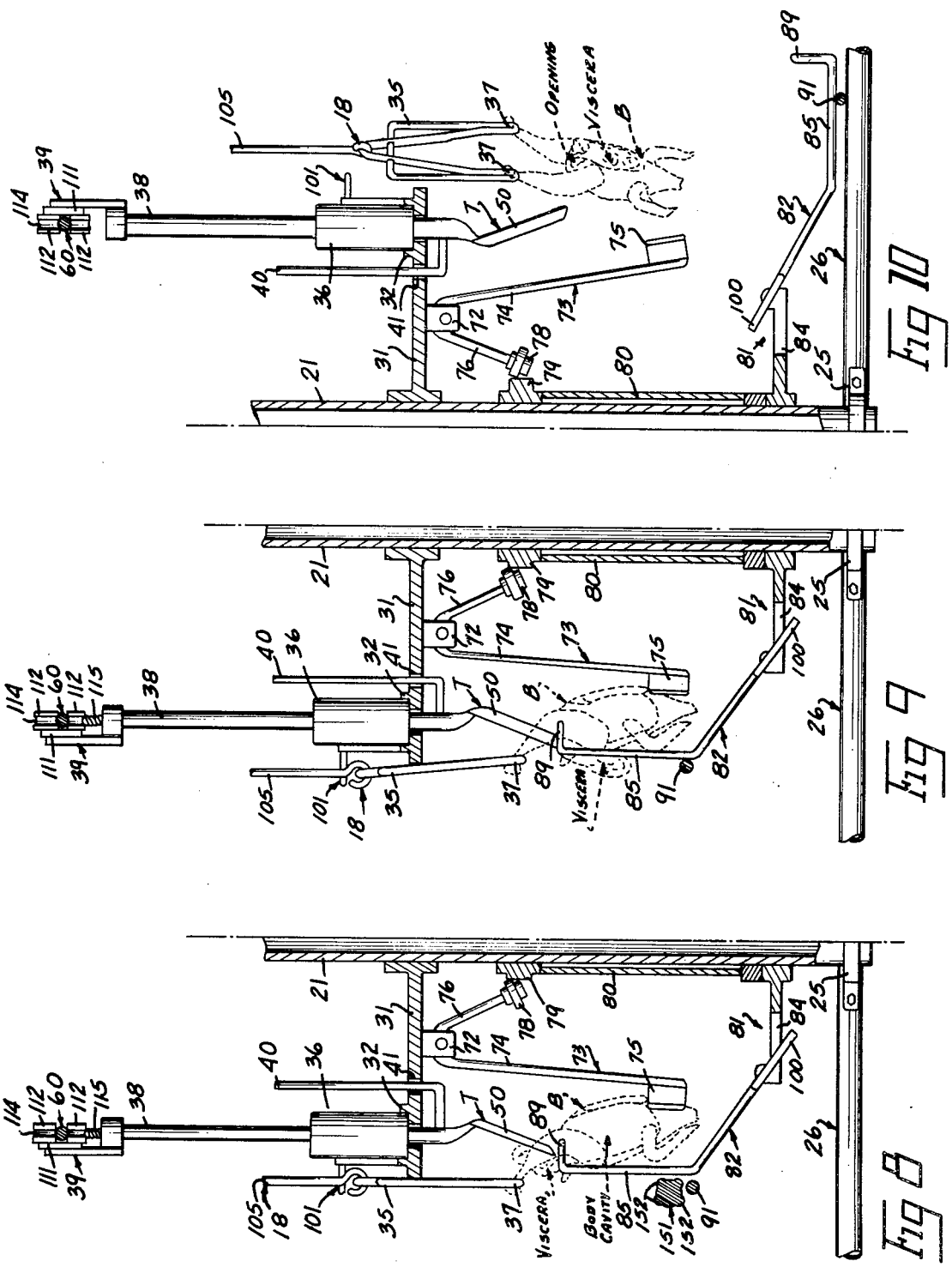

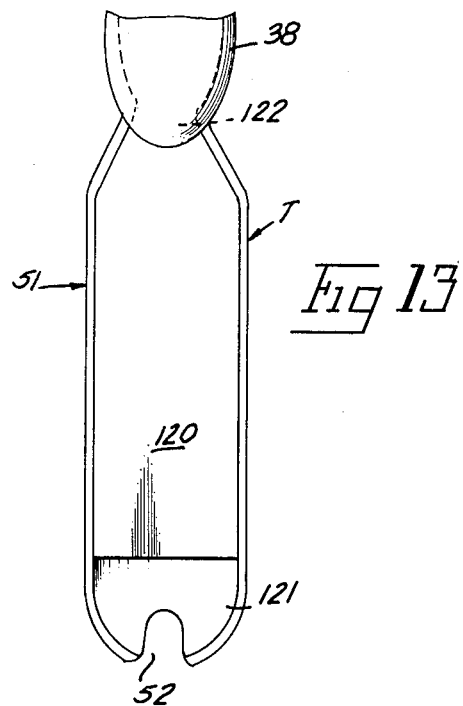
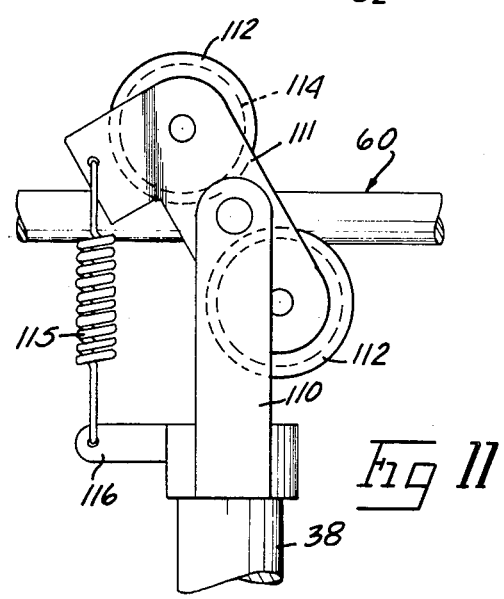

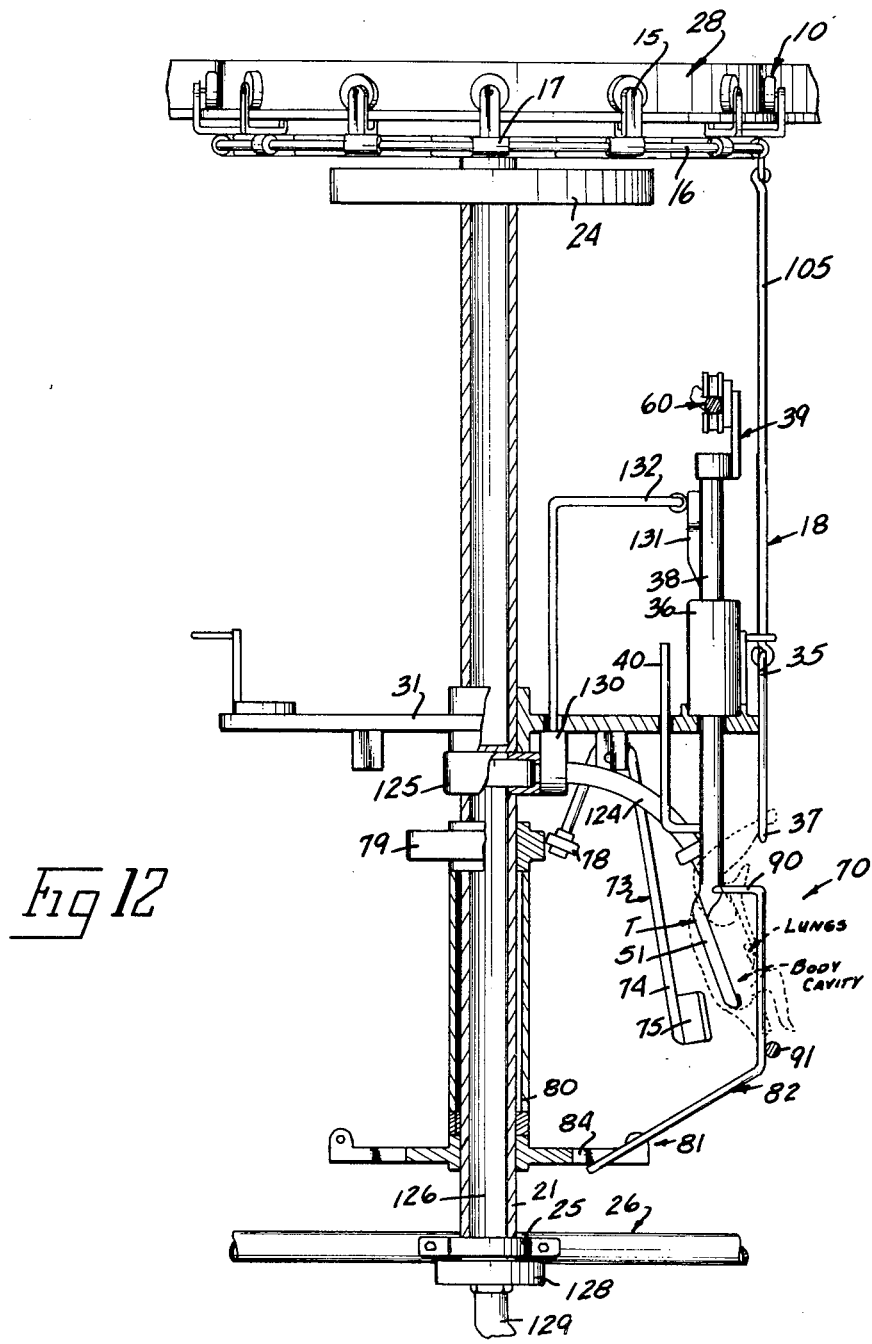

3,986,231

POULTRY PROCESSING METHOD

CROSS-REFERENCE TO RELATED APPLICATIONS

This application is a division of my co-pending application Ser. No. 228,962, filed Feb. 24, 1972 for "Poultry Processing Method and Apparatus", now U.S. Pat. No. 3,806,988.

BACKGROUND OF THE INVENTION

Heretofore, the processing of poultry and other fowl into ready-to-cook form required manual labor in many of the processing operations, especially in the removal of the viscera of the bird. This has been due mainly to the inability of the poultry processing industry to mechanically orient and hold each bird adequately during the processing thereof and to mechanically reproduce the manual steps of processing the bird while synchronously moving the bird with the various tools carrying out the processing operations. The use of manual labor in the processing of poultry has caused the processing cost to remain high and has caused difficulties in duplicating the same operations for each bird to control contamination of the carcass and to prevent mutilation and loss of edible parts of the poultry.

SUMMARY OF THE INVENTION

These and other problems and disadvantages associated with the prior art are overcome by the invention disclosed herein by providing for the mechanical orientation of the bird with respect to the processing tool and for the operation of the tool while the bird is so held to perform the processing operation. The power for the operation can be supplied from the conveyor used to transport the fowl from processing station to processing station. By driving the support and orientation device with the conveyor, synchronization is always maintained between the movement of the birds and the device to insure duplication of operation. Moreover, because the bird is adequately supported and oriented, any of a plurality of processing operations may be performed on the bird mechanically.

The apparatus of the invention includes a conveyor for successively moving the poultry along a prescribed path in a head lowermost position, a tool support means for carrying a processing tool and an orienting means for engaging the poultry carried by the conveyor and supporting same with respect to the tool for the processing operation. The tool support means and orienting means are driven by the conveyor so that no additional power source is needed at each processing station and synchronization is insured between the poultry, tool and orienting means. Means are also provided for selectively moving the tool with respect to the bird to perform the processing operation. Cam means are also provided for moving the orienting means with respect to the bird synchronously with the movement of the tool to properly orient and hold the bird for the processing operation.

The method of processing poultry includes conveying the poultry in a head lowermost position successively along a prescribed path, moving a processing tool synchronously with each of the birds, moving the tool through a series of predetermined positions with respect to the bird as it is moved synchronously therewith, and selectively holding and orienting each bird by its body as the tool is moved through the series of predetermined positions to orient the tool with respect to the bird during the processing operation.

These and other features and advantages of the invention will become more clearly understood upon consideration of the following specification and accompanying drawings wherein like characters of reference designate corresponding parts throughout the several views and in which:

BRIEF DESCRIPTION OF THE DRAWINGS

FIG. 5 is a sectional schematic view taken along lines 5—5 in FIGS. 3 and 4 showing the bird approaching the processing station;

FIG. 6 is a sectional schematic view taken along line 6—6 in FIGS. 3 and 4 showing the bird being oriented for insertion of the processing tool;

FIG. 7 is a sectional schematic view taken along line 7—7 in FIGS. 3 and 4 showing the processing tool inserted in the bird, and the bird being oriented for withdrawal of the tool;

FIG. 8 is a sectional schematic view taken along line 8—8 in FIGS. 3 and 4 showing the processing tool withdrawn and the viscera being separated from the bird;

FIG. 9 is a sectional schematic view taken along line 9—9 in FIGS. 3 and 4 showing the bird being manipulated for better positioning the viscera for inspection;

FIG. 10 is a sectional schematic view taken along line 10—10 in FIGS. 3 and 4 showing the bird after the processing operation;

FIG. 11 is an enlarged detail view showing the construction of the cam follower mechanism for activating the processing tool;

FIG. 12 is a partial vertical cross-sectional view taken through the processing station using the vacuum tool; and FIG. 13 is an enlarged view showing the vacuum tool.

These figures and the following detailed description disclose specific embodiments of the invention, however, it is to be understood that the invention may be embodied in other forms.

DETAILED DESCRIPTION OF ILLUSTRATIVE EMBODIMENTS

Figure 1:
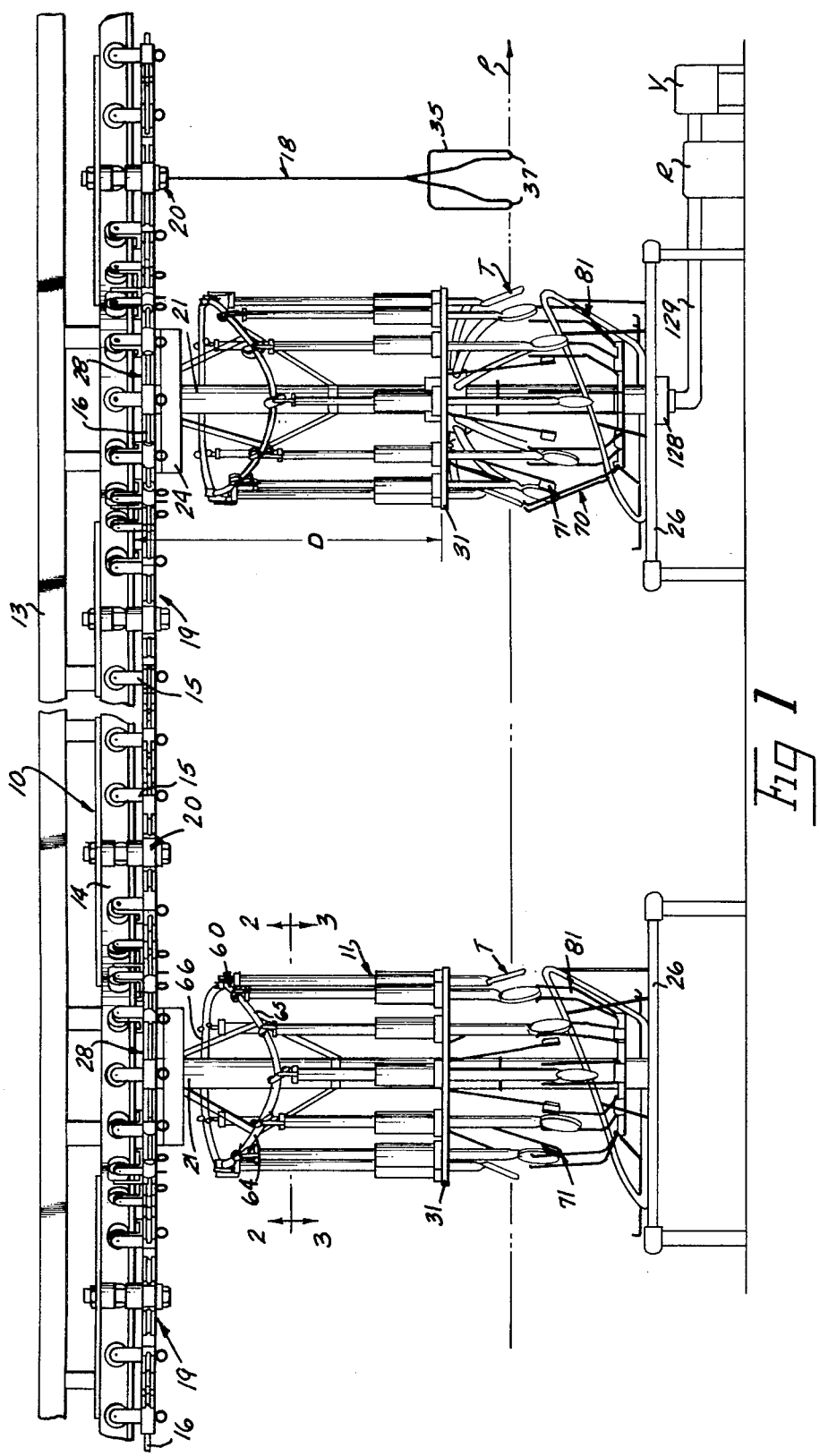
FIG. 1 is a partial side elevational view of the invention showing two processing stations.
Figure 2:
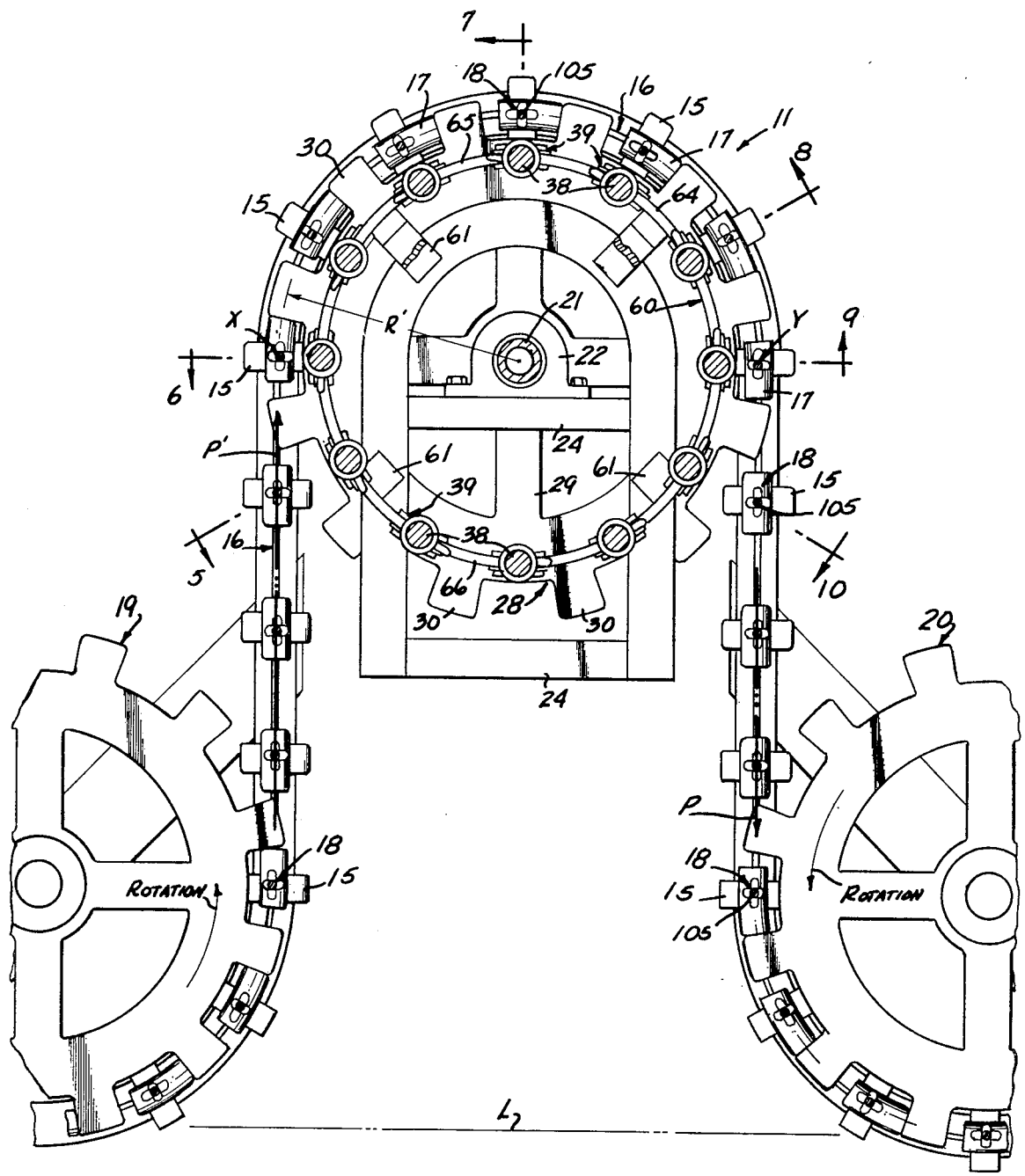
FIG. 2 is an enlarged cross-sectional view taken along line 2—2 in FIG. 1.
Figure 3:
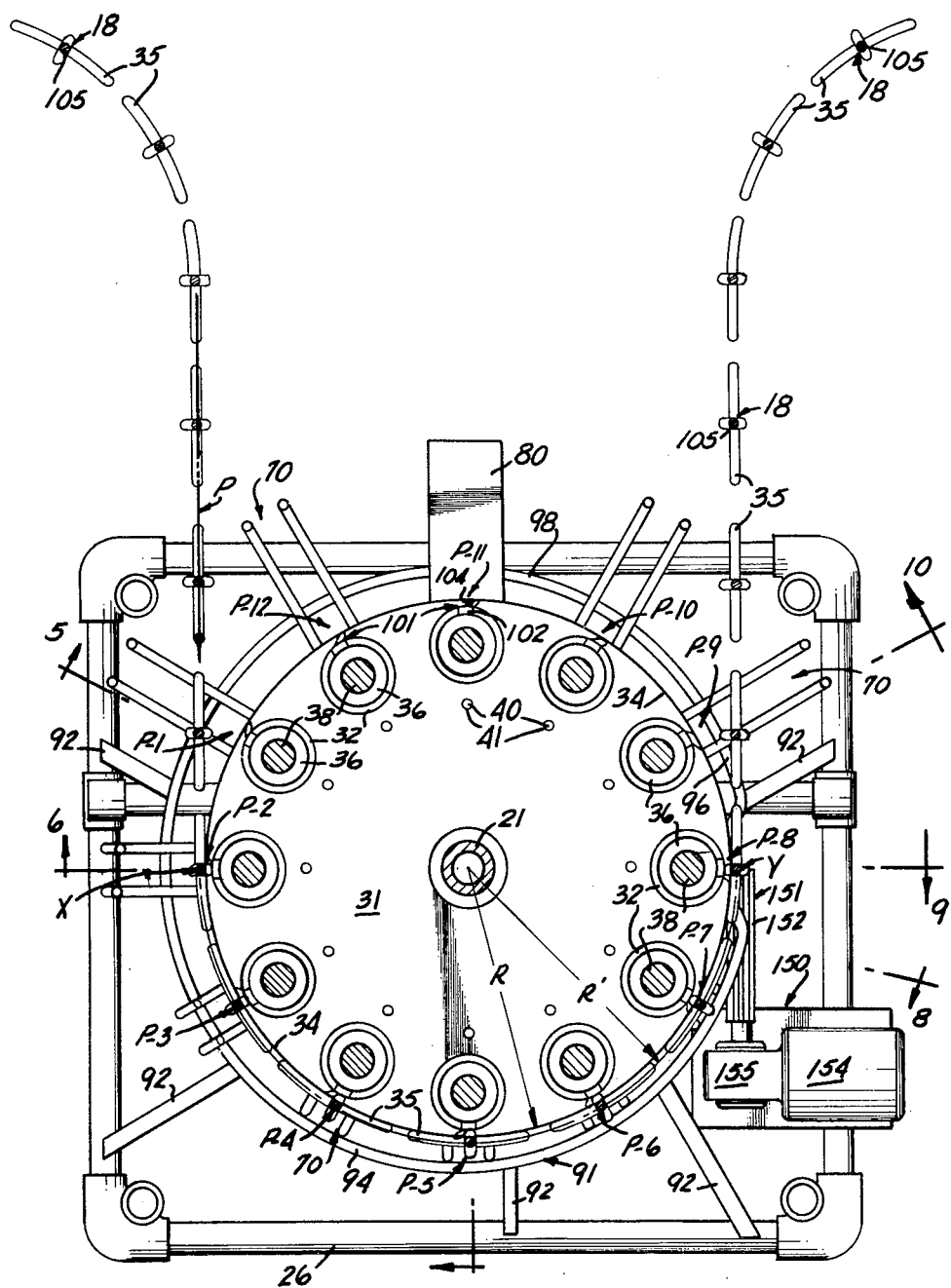
FIG. 3 is an enlarged cross-sectional view taken along line 3—3 in FIG. 1.

Referring to the figures, especially FIG. 1, the apparatus of the invention includes a conveyor system 10 with a first processing station 11 and a second processing station 12. Referring to FIGS. 2 and 3, the conveyor 10 moves the poultry or other fowl from left to right as seen in FIG. 1 along a prescribed serpentine path P having a main straight portion lying along line L as seen in FIGS. 2 and 3 and a secondary curved portion P' at each processing station 11 and 12. It is to be understood that any number of processing stations may be provided along the conveyor system 10 with each performing a separate processing operation.

As best seen in FIGS. 1 and 2, the conveyor system 10 includes a track 14 carrying a plurality of trolleys 15. The trolleys 15 shown are driven successively in a predetermined spaced relation by a conventional cable drive 16, it being understood that various drives may be used. Each trolley 15 carries a shackle assembly 18 suspended therefrom in conventional manner. A 90° turn idler unit 19 is provided in the conveyor system 10 for moving the trolleys 15 away from the main portion of path P to the stations 11 or 12 and a like idler unit 20 is provided for returning the trolleys 15 back to the main portion of the path P after they have passed through the station 11 or 12. Because both processing stations 11 and 12 have substantially the same construction except for the particular processing tool used, only the station 11 will be described in detail with like numerals being applied to corresponding parts of station 12.

Referring to FIGS. 1-3, the processing station 11 includes a main shaft 21 journaled at its upper end in bearing 22 carried by upper frame 24. Frame 24 is in turn carried by the support frame 13 mounting conveyor system 10. The lower end of shaft 21 is journaled in bearing 25 mounted on lower frame 26. Bearings 22 and 25 are arranged so that shaft 21 is vertical and a 180° idler unit 28 is connected to the upper end of shaft 21 so that shaft 21 will be driven by unit 28.

Unit 28 has its idler sprocket 29 attached to shaft 21 above bearing 22 so that as the cable drive 16 engages and moves the driven lugs 30 through cable connectors 17 of each trolley 15, the sprocket 29 and shaft 21 will be rotated at the same speed as the conveyor system 10 is operating. Thus, synchronization between the rotation of shaft 21 and conveyor system 10 is always maintained.

A circular tool support table 31 is attached to shaft 21 intermediate its ends and rotatable therewith. The support table 31 lies in a horizontal plane and has an outside radius R in FIG. 3 which corresponds to the turn radius R' of the conveyor system 10 and path P as best seen in FIG. 2. A plurality of tool support holders 32 are mounted adjacent the outside edge 34 of table 31 and equally spaced therearound. The holders 32 correspond in number to twice the number of trolleys 15 turning around the sprocket 29 at any one time less one and are located so as to lie in radial alignment with and adjacent one of the shackle assemblies 18 while it is making the 180° turn about the sprocket 29 from point X to point Y as seen in FIGS. 2 and 3. While 12 holders 32 are illustrated, it is to be understood that this number may be varied from application to application. The distance D of table 31 below conveyor system 10 as seen in FIG. 1 is sufficient for the shackle 35 of assemblies 18 carrying the birds to engage the edge 34 of table 31.

A tool support 36 is fixedly mounted in each holder 32 and a tool mandrel 38 is journaled in the support 36. The mandrel 38 extends above the support 36 and is provided with a cam follower mechanism 39 as will be explained. The mandrel 38 also extends below the table 31 through an appropriate opening (not shown) in the table aligned with holder 32 and mounts a processing tool T thereon. An L-shaped upstanding guide 40 is also connected to the lower end of mandrel 38 and slidable extends up through a guide aperture 41 through table 31 to maintain the relative rotational position of the mandrel 38 with respect to table 31 fixed at all times as best seen in FIGS. 5-10. Thus, the mandrel 38 may be selectively reciprocated in support 36 and with respect to table 31 as will be explained.

The tools T shown at station 11 in FIG. 1 and in FIGS. 2-10 are spoon-shaped eviserating tools 50 while the tools T at station 12 in FIG. 1 and in FIGS. 12 and 13 are vacuum tools 51 for the removal of selected internal parts of the bird such as the lungs. It is to be understood, however, that tools T may have any of a variety of configurations in accordance with the particular processing operation to be performed.

The eviserating tools 50 as best seen in FIGS. 1 and 4-10 have an elongated spoon shape to extend into the bird cavity under the viscera and then withdraw the viscera through an appropriate opening in the rear portion of the bird. The extending free end of the tool 50 may be notched as at 52 to assist in removing the viscera closely adjacent the backbone.

Figure 4:
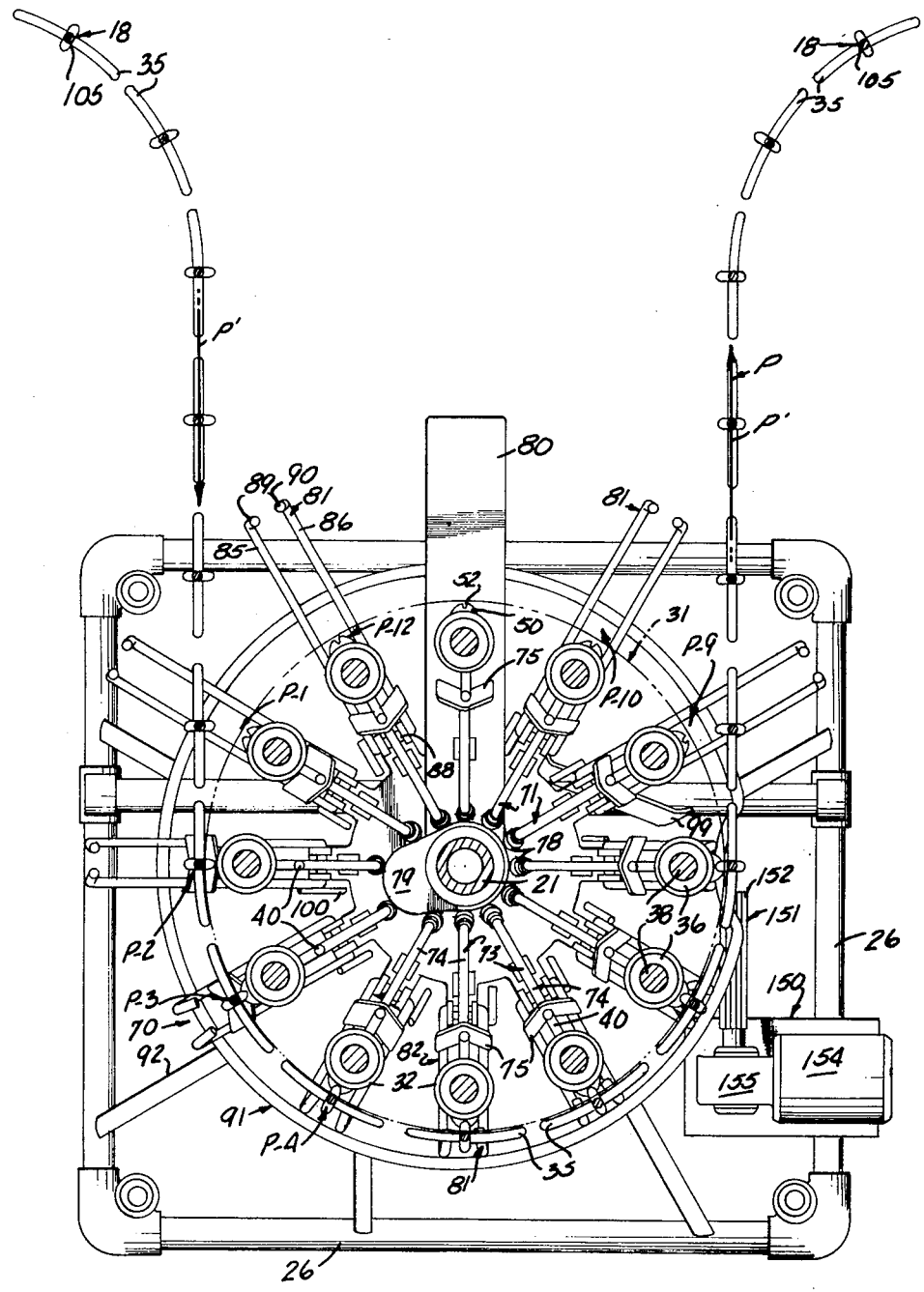
FIG. 4 is an enlarged cross-sectional view taken along line 3—3 in FIG. 1 showing the tool support table in phantom lines.

Since the conveyor system 10 illustrated moves the birds along the path P at a constant height from floor level, a fixed annular cam 60 shown in FIGS. 1 and 2 is mounted on the upper frame 24 at station 11 by brackets 61. The cam follower mechanism 39 attached to the upper end of each mandrel 38 engages the cam 60 and selectively deflects the mandrel 38 and tool T downwardly from approximately positions P-2 through P-5, returns the mandrel 38 and tool T back to their upper position from approximately positions P-5 through P-7 and maintains the mandrel 38 and tool T in their upper dwell position from positions P-7 through P-2 as the mandrels 38 and tool T are moved by conveyor system 10 through table 31 as best seen in FIGS. 2-4. This is provided by cam 60 having a downward deflection portion 64, a upward return portion 65 and a dwell portion 66 as best seen in FIG. 2. It is to be understood that the amount of downward deflection of tool T depends on bird size and internal cavity configuration. Moreover, it is to be further understood that conveyor system 10 may be provided with a rise and return portion to move the bird with respect to the tool T without the use of cam 60.

The cam follower mechanism 39 includes an upstanding pivot arm 110 as best seen in FIGS. 5-11 connected to the upper end of the mandrel 38. A pivot link 111 is pivoted to the arm 110 at its center and rotatably mounts a cam follower roller 112 at each end thereof on the side of link 111 opposite arm 110. The rollers 112 are grooved at 114 to engage the annular cam 60. The center to center spacing of rollers 112 is sufficient to allow the cam 60 to be placed between them when the link 111 is substantially vertical but will engage the upper and lower sides of the cam 60 when the link 111 is pivoted to the position shown in FIG. 11. A coil spring 115 connects one end of link 11 with an extension 116 on the upper end of mandrel 38 to resiliently urge the link 111 toward the position shown in FIG. 11 to force rollers 112 into engagement with cam 60 so that mandrel 38 and tool T will be reciprocated as the table 31 moves the supports 36 and their associated mandrels 38 with tools T about the processing station 11 or 12.

For properly positioning each bird while the tools T are reciprocated, an orienting means 70 is provided for each tool T which moves with the table 31 and shaft 21 as best seen in FIGS. 3 and 4. Each orienting means 70 engages and supports the bird in conjunction with the shackle 35 so that the bird carried by the shackle 35 can be properly oriented with respect to the tool T associated with the means 70 for the processing operation.

Each orienting means 70 illustrated has a first orienting subassembly 73 for orienting the bird from one side thereof as seen in FIGS. 4-6. The subassembly 73 illustrated positions the bird during the insertion of the eviscerating tool 50 or vacuum tool 51 into the body cavity of the bird during its travel from position P-2 to position P-4.

The first subassembly 73 includes a curved support member 71 pivotally mounted on ears 72 attached to the underside of table 31. The ears 72 position the member 71 so that it can be pivotally moved in a vertical plane through which the radial line joining the centers of table 31 and the tool support 36 associated with subassembly 73 passes. The longer depending leg 74 of member 71 nearest the tool T mounts a V-shaped deflection plate 75 adapted to engage the lower body portion of the bird underlying the associated tool T as best seen in FIG. 6. The shorter depending leg 76 of member 71 rotatably mounts a cam follower roller 78 so that as the roller 78 is selectively displaced, the deflection plate 75 will accordingly be moved toward and away from the bird held under tool T by shackle 35.

A radial cam 79 is rotatably mounted about shaft 21 and is held stationary with respect to the lower frame 26 by a carriage assembly 80. The cam 79 is dimensioned to engage the roller 78 of each subassembly 73 and provide for the proper engagement of each deflection plate 75 with the bird to orient same during the insertion of the tool T into the body cavity as will be explained. It is to be understood, however, that the particular shape and size of the cam 79 may be varied according to bird size and species.

Each orienting means 70 illustrated also has a second orienting subassembly 81 for orienting and supporting the bird from that side opposite the one engaged by the first subassembly 73 as seen in FIGS. 4-10. The subassembly 81 illustrated positions and retains the bird during the withdrawal of the eviscerating tool 50 or vacuum tool 51 from the body cavity of the bird during its travel from position P-4 to position P-8.

Each second subassembly 81 includes a U-shaped rod member 82 pivotally mounted on a carriage plate 84 attached to shaft 21 below table 31 and rotatable with shaft 21. The rod member 82 is in vertical alignment with its associated processing tool T with its legs 85 and 86 extending substantially radially outward from plate 84. The legs 85 and 86 are joined by a central web 88 which serves as the pivot shaft for the member 82. The legs 85 and 86 have upwardly and inwardly bent hooks 89 and 90 respectively at their outermost ends as seen in FIG. 4. The member 82 is dimensioned so that when it is pivoted up along the outside of the bird, the hooks 89 and 90 will engage the bird between its body and legs on either side of tool T to prevent the upward movement of the bird while the body of the bird will rest on the legs 85 and 86 as best seen in FIG. 7 to hold the bird during retraction of tool T as will be explained.

The rod member 82 is positioned by a substantially annular stationary cam 91 mounted on the lower frame 26 by brackets 92 as best seen in FIG. 4. The cam 91 engages the legs 85 and 86 to pivot the member 82 upwardly and inwardly to engage the bird. The cam 91 has a rise portion 94 from approximately position P-1 through P-7, a short dumping rise portion 95 at position P-8, a return portion 96 between positions P-8 and P-9, and a dwell portion 98 from approximately position P-9 back to position P-1. A stationary subcam 99 is also mounted on frame 26 to engage a cam follower extension 100 on member 82 to insure that member 82 will release the bird and return to its lowermost position along the return portion 96 of cam 91.

Each orienting assembly 70 also includes a third subassembly 101 as seen in FIGS. 1 and 3 for engaging the shackle assembly 18 above the shackle 35 to maintain the proper relative position between the tool T and the shackle 35 with the bird carried by the shackle during the processing operation performed at station 11 or 12. The subassembly 101 includes an upstanding extension 102 on the tool support holder 32 with a driving dog 104 extending horizontally outwardly therefrom at an angle with respect thereto. The dog 104 engages the shackle connecting link 105 above the shackle 35 to hold same while the shackle 35 with its bird is moved through the processing station 11 or 12.

A vibrating mechanism 150 is also carried by the lower frame 26 for insuring that the viscera is properly removed from the body cavity of the bird and is released from tool 50. The mechanism 150 includes a roll 151 having ridges 152 thereon which extend into the path of travel of the rod member 82 between stations P-7 and P-8. The roll 151 is illustrated as rotatably driven by a motor 154 through transmission 155, however, it is to be understood that the roll 151 could be driven from shaft 21. The ridges 152 engage the outside of the rod members 82 as they move thereby to periodically drive the members 82 inwardly to cause the viscera to be forcibly separated from the bird and freed from the tool 50 as will be explained. It will be noted that the mechanism 150 is not necessary at station 12.

Referring specifically to FIGS. 12 and 13, the vacuum tool 51 has the same general shape as the eviserating tool 50. The open top of each tool 51 has been partially closed by a plate 120 to provide an opening 121 adjacent the tip of the tool 51. The opening 121 communicates with a vacuum source V (see FIG. 1) through passage 122 in tool 51, tubing 124, manifold 125 mounted below table 31 and rotatable therewith, passage 126 in shaft 21, rotary joint 128 at the lower end of shaft 21, and tubing 129 through reservoir R.

The construction and operation of the orienting means 70 associated with each tool 51 as well as mandrel 38, support 36, table 31, cam follower mechanism 39 and cam 60 is the same as for tool 50. A valve 130 selectively connects the opening 121 with vacuum source V during the withdrawal of tool 51 from the body cavity of the bird to remove any remaining viscera parts such as the lungs therefrom as will be explained. A cam lobe 131 on each mandrel 38 activates the valve 130 through its activating arm 132 extending up through a slot 134 in table 31 as seen in FIG. 12.

OPERATION

In operation, the birds B, shown in dashed lines in the figures, are suspended by their legs from the holding portions 37 of the shackles 35 so that the birds are in their conventional head lowermost position used in the processing industry. The conveyor system 10 moves the birds B successively along the prescribed path P through the eviscerating station 11 and lung removal station 12. Although there are normally inspection and viscera trim stations between the eviscerating station 11 and lung removal station 12, these stations have been omitted in the drawings for sake of simplicity since these stations are conventional.

As the conveyor system 10 moves the birds B along path P toward station 11, the cable drive 16 is rotating idler sprocket 29 and shaft 21 at the same speed as the birds are being moved. This causes one of the eviscerating tools 50 and the orienting means 70 to be vertically aligned with each bird as it passes through station 11. Before the bird B reaches position P-1 as seen in FIG. 5, an access opening has been made at the vent of sufficient size to receive the eviscerating tool 50 into the body cavity of the bird. The cutting of the opening is made in conventional manner.

When the bird is at position P-1, the cam 79 has started to move the deflection plate 75 toward the breast portion of the approaching bird B. It will be noted that the breast portion of the bird is facing the table 31 and plate 75.

The cable drive 16 continues to move the bird synchronously with the tool 51 and means 70 to position P-2 as seen in FIG. 6. The cam 70 has now caused the deflection plate 75 to engage the breast portion of the bird and pivot the bird so that the opening is aligned with the tip of tool 50. The cam 60 has started to lower mandrel 38 and tool 50 toward the opening and the cam 91 has started to pivot rod member 82 upwardly and inwardly toward the back of the bird. Shackle 35 has been engaged by the edge 34 of table 31 to prevent the shackle from twisting and the dog 104 has engaged the connecting link 105 of the shackle assembly 18 to maintain vertical alignment between the bird B and tool 51.

As the bird moves through positions P-3 and P-4 to the position P-5 shown in FIG. 7, the cam 60 has moved the tool 50 into the body cavity while the deflection plate 75, through cam 79, has moved the bird B so that the tool 50 passes down into the body cavity adjacent to breast or keel bone of the bird and under the viscera. At the same time, the cam 91 has pivoted the rod member 82 upwardly and inwardly to a position whereby the hook portions 89 and 90 pass over the juncture of the body and legs of the bird on either side of the tool 50 and the back of the bird rests against the legs 85 and 86 of member 82. The tool 50 is now ready to be retracted withdrawing the viscera with it.

As the bird is moved to position P-7, cam 60 withdraws tool 50 by returning the mandrel to its upper position while the cam 91 continues to pivot the member 82 inwardly to insure that the notch 52 in the tool passes along the backbone of the bird. The hook portions 89 and 90 prevent upward movement of the bird during this operation while the shackle 35 prevents the downward movement thereof to fix the vertical location of the bird. The viscera is now drawn from the bird.

As the bird is moved toward position P-8, the ridges 152 on the rotating roll 151 engage the member 82 to rapidly oscillate the member 82 and bird B with respect to the tool 50 as shown in FIG. 8. This causes the resilient tissue tending to maintain the viscera connected to the bird to separate and allow the viscera to drop out of the tool 50.

As the conveyor system 10 continues to move the bird to position P-8 as seen in FIG. 9, the dumping rise portion 95 of cam 91 pivots the member 82 inwardly to dump the viscera off of the upper portion (the rear end) of the bird and allow it to drop off the back of the bird for inspection. Because the crop of the bird is only partially drawn as disclosed in my aforementioned co-pending patent application, the viscera will hang over the back of the bird properly exposed for inspection.

As the bird continues toward position P-9, the return portion 96 of cam 91, in conjunction with sub-cam 99 engaging extension 100 on member 82, causes the member 82 to release the bird for movement away from station 11 as shown in FIG. 10 to be inspected and the viscera trimmed and fully drawn.

Because there is a tendency to leave at least a portion of the lungs in the body cavity of the bird as illustrated in FIG. 12, the tool 51 at station 12 is used. After the birds have been inspected and viscera fully drawn, the conveyor system 10 moves the birds to station 12. The tool 51 and orienting means 70 of station 12 pass through the same motions as described above for station 11. The cam lobe 131 on mandrel 38 as best seen in FIG. 12 causes the arm 132 to be operated to activate valve 130 and connect the opening 121 to the vacuum source V. As the tool 51 passes adjacent the lungs, they will be sucked into opening 121 and pass into reservoir R.

It is to be understood that the birds may be placed in the shackles so that their backs face in toward table 30 for the tools 50 and 51 to pass into the body cavity along the back and be withdrawn along the breast or keel bone. Also the orientation of the means 70 and tool T may be reversed to do the same thing.

While specific embodiments of the invention have been disclosed herein, it is to be understood that full use may be made of substitutions, equivalents, or modifications without departing from the scope of the inventive concept.

I claim:

1. A method of eviscerating poultry having an access opening into their body cavity formed at their vent comprising the steps of:
    a. supporting the poultry by their hocks in a head lowermost position by a shackle member;
    b. selectively and reciprocally moving an eviscerating tool having an operating end along a generally straight eviscerating path for insertion of the operating end of said eviscerating tool into the body cavity through the access opening and for withdrawing the operating end of said eviscerating tool from the body cavity through the access opening;
    c. restraining the poultry against movement generally with said tool as said tool is withdrawn from the body cavity by engaging the poultry with a holding member on opposite sides of the body of the poultry at the joints between its legs and body to maintain the access opening to the body cavity of the poultry at its vent in a relatively fixed plane while allowing relative pivotal movement of the poultry about the joints between its legs and body; and
    d. resiliently urging the back of the poultry toward said eviscerating tool as said eviscerating tool is withdrawn from the body cavity to cause the operating end of said eviscerating tool to ride along the backbone of the bird within the body cavity during the withdrawal of the operating end of said eviscerating tool.

2. The method of claim 1 further including the step of resiliently urging the breast portion of the poultry toward said tool as said tool is inserted into the body cavity to cause the operating end of said eviscerating tool to ride along the keelbone of the poultry within the body cavity during the insertion of the operating end of said eviscerating tool.

3. The method of claim 2 further including the steps of maintaining substantially vertical alignment between said shackle member, said tool and said holding member during said step of moving said tool into and out of the body cavity; moving said shackle member along a first prescribed path having an arcuate portion about a central axis; moving said tool along a prescribed primary circular path having a portion thereof concentric with said arcuate portion of said first prescribed path; and, moving said holding member along a prescribed secondary circular path concentric with said primary circular path.

4. The method of claim 1 further including the steps of:
moving the shackle member and thus the poultry along a prescribed conveying path while the poultry is supported by their hocks in a head lowermost position; and,
moving the eviscerating tool and the holding member synchronously with the shackle member while maintaining vertical alignment between the shackle member, the tool and the holding member during said step of moving the tool into and out of the body cavity.

5. The method of claim 4 wherein the conveying path has an arcuate portion centered on a central axis along which the shackle member is moved and wherein the step of moving the eviscerating tool and the holding member further includes moving the tool along a prescribed primary circular path centered on the central axis and having a portion thereof concentric with the arcuate portion of the prescribed conveying path, and moving the holding member along a prescribed secondary circular path centered on the central axis and concentric with the primary circular path.

6. The method of claim 1 wherein said supporting step further includes moving the shackle member along a prescribed conveying path having an arcuate portion with a prescribed radius centered on a central axis; wherein said selectively and reciprocally moving step further includes moving the eviscerating tool so that the generally straight eviscerating path is moved along a primary circular path concentric about the central axis while maintaining alignment between the eviscerating tool and the shackle member while the shackle member is moved along the arcuate portion of the prescribed conveying path; and wherein said restraining step further includes moving the holding member along a secondary circular path concentric about the central axis while maintaining alignment between the holding member and the shackle member while the shackle member is moved along the arcuate portion of the prescribed conveying path.

* * * * *